(12) United States Patent
Shimatani et al.

(10) Patent No.: US 8,792,116 B2
(45) Date of Patent: Jul. 29, 2014

(54) PRINTING CONTROLLER, GUI DISPLAY METHOD, PRINTER DRIVER, AND RECORDING MEDIUM

(75) Inventors: Takayuki Shimatani, Tokyo (JP); Yuki Yamashita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1107 days.

(21) Appl. No.: 11/913,707

(22) PCT Filed: Mar. 1, 2007

(86) PCT No.: PCT/JP2007/054495
§ 371 (c)(1),
(2), (4) Date: Nov. 6, 2007

(87) PCT Pub. No.: WO2007/105577
PCT Pub. Date: Sep. 20, 2007

(65) Prior Publication Data
US 2009/0303519 A1 Dec. 10, 2009

(30) Foreign Application Priority Data

Mar. 10, 2006 (JP) ................................ 2006-066269
Jan. 24, 2007 (JP) ................................ 2007-014071

(51) Int. Cl.
*G06F 3/12* (2006.01)
*G06F 9/44* (2006.01)

(52) U.S. Cl.
CPC ............ *G06F 9/4448* (2013.01); *G06F 3/1297* (2013.01)
USPC ......... 358/1.15; 358/1.9; 358/1.18; 358/1.13; 358/1.2; 345/156

(58) Field of Classification Search
None
See application file for complete search history.

(56) References Cited

U.S. PATENT DOCUMENTS

| 5,321,803 | A | * | 6/1994 | Ditter, Jr. ...................... 715/703 |
| 5,794,052 | A | | 8/1998 | Harding |
| 6,445,421 | B1 | * | 9/2002 | Pang et al. .................... 348/468 |
| RE41,525 | E | * | 8/2010 | Chien et al. ................... 348/468 |
| 8,310,709 | B2 | * | 11/2012 | Cho ............................. 358/1.15 |

(Continued)

FOREIGN PATENT DOCUMENTS

| JP | 2000-181650 | 6/2000 |
| JP | 2000-250721 | 9/2000 |

(Continued)

OTHER PUBLICATIONS

Susamma Barua, et al., "JINI enabled Printer Interface (JEPI)", IEEE SMC, International Conference on Systems, Man and Cybernetics, vol. 2, XP010623347, Oct. 6, 2002, 6 pages.

*Primary Examiner* — Hilina K Demeter
(74) *Attorney, Agent, or Firm* — Oblon, Spivak, McClelland, Maier & Neustadt, L.L.P.

(57) ABSTRACT

A printing controller having a printer driver configured to display a GUI using language-dependent files containing the display character strings of corresponding languages is disclosed. The printing controller includes a compressed language-dependent file into which the language-dependent files are compressed, a language selection part configured to cause one of the languages which one is used by the printer driver to be selected, and an expansion part configured to expand one of the language-dependent files related to the selected one of the languages from the compressed language-dependent file. The printer driver displays the GUI using the one of the language-dependent files expanded by the expansion part.

9 Claims, 12 Drawing Sheets

(56) References Cited

U.S. PATENT DOCUMENTS

| | | | |
|---|---|---|---|
| 2002/0010806 A1* | 1/2002 | Yamade | 709/327 |
| 2004/0156071 A1* | 8/2004 | Lay et al. | 358/1.15 |
| 2005/0168777 A1 | 8/2005 | Nishikawa et al. | |
| 2006/0050323 A1* | 3/2006 | Wada | 358/302 |
| 2006/0173671 A1* | 8/2006 | Okawa | 704/5 |
| 2006/0287860 A1* | 12/2006 | Agapi et al. | 704/260 |
| 2007/0002355 A1* | 1/2007 | Kai | 358/1.13 |
| 2007/0276652 A1* | 11/2007 | Oki | 704/9 |
| 2008/0177994 A1* | 7/2008 | Mayer | 713/2 |

FOREIGN PATENT DOCUMENTS

| | | |
|---|---|---|
| JP | 2000-339075 | 12/2000 |
| JP | 2001-060196 | 3/2001 |
| JP | 2001-142600 | 5/2001 |
| JP | 2002-328671 | 11/2002 |
| JP | 2003-058357 | 2/2003 |
| JP | 2005-195835 | 7/2005 |

* cited by examiner

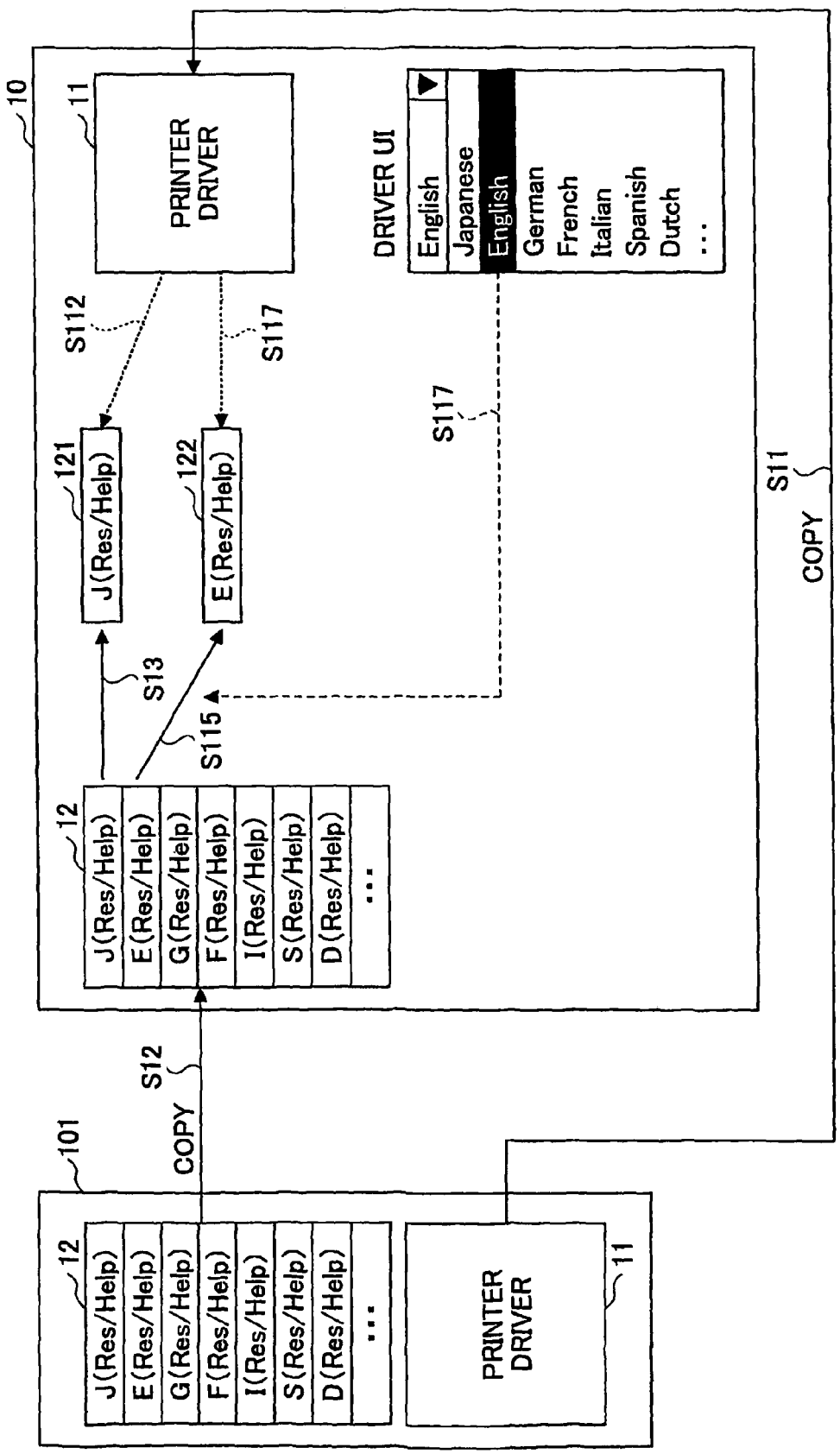

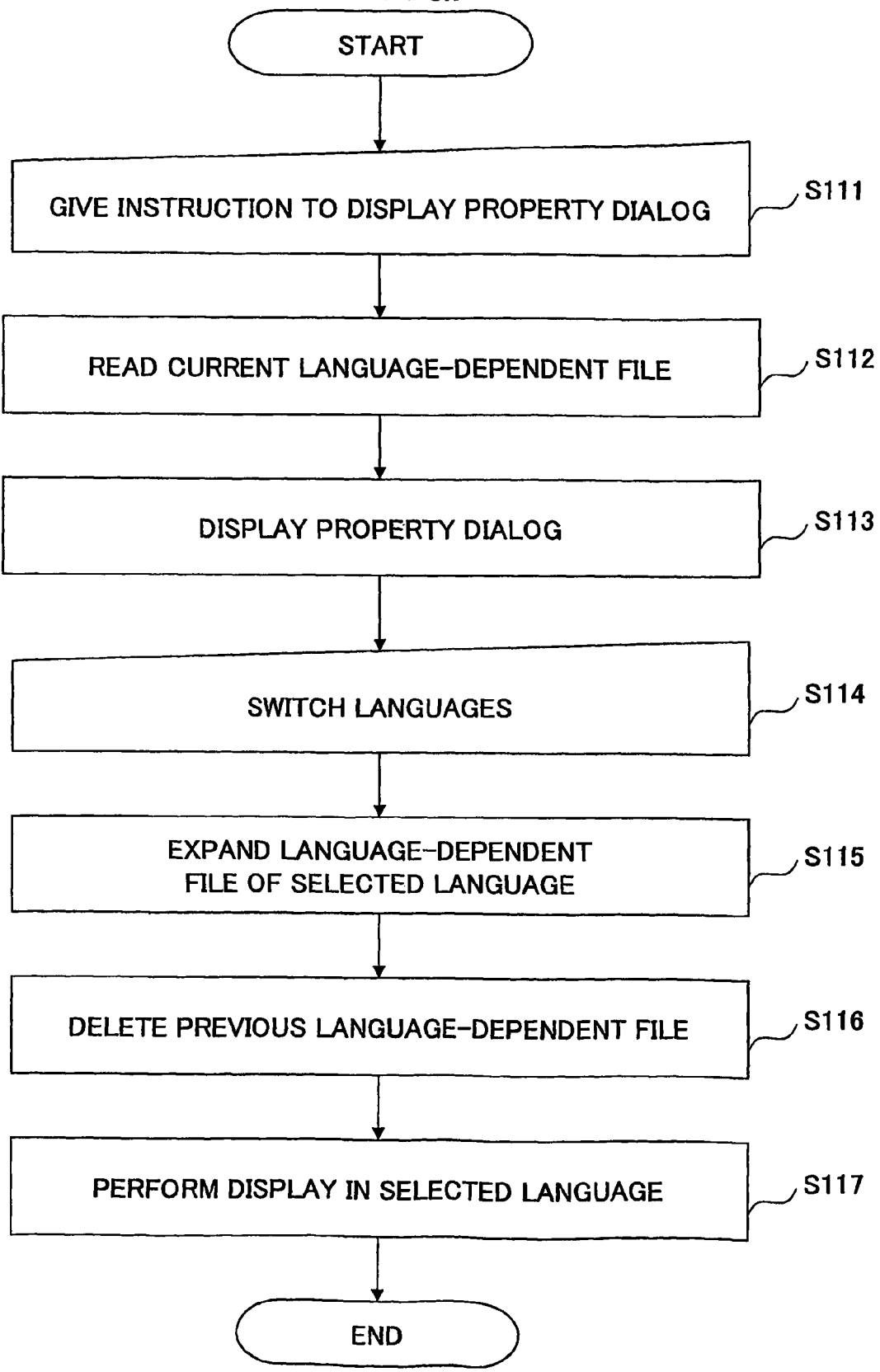

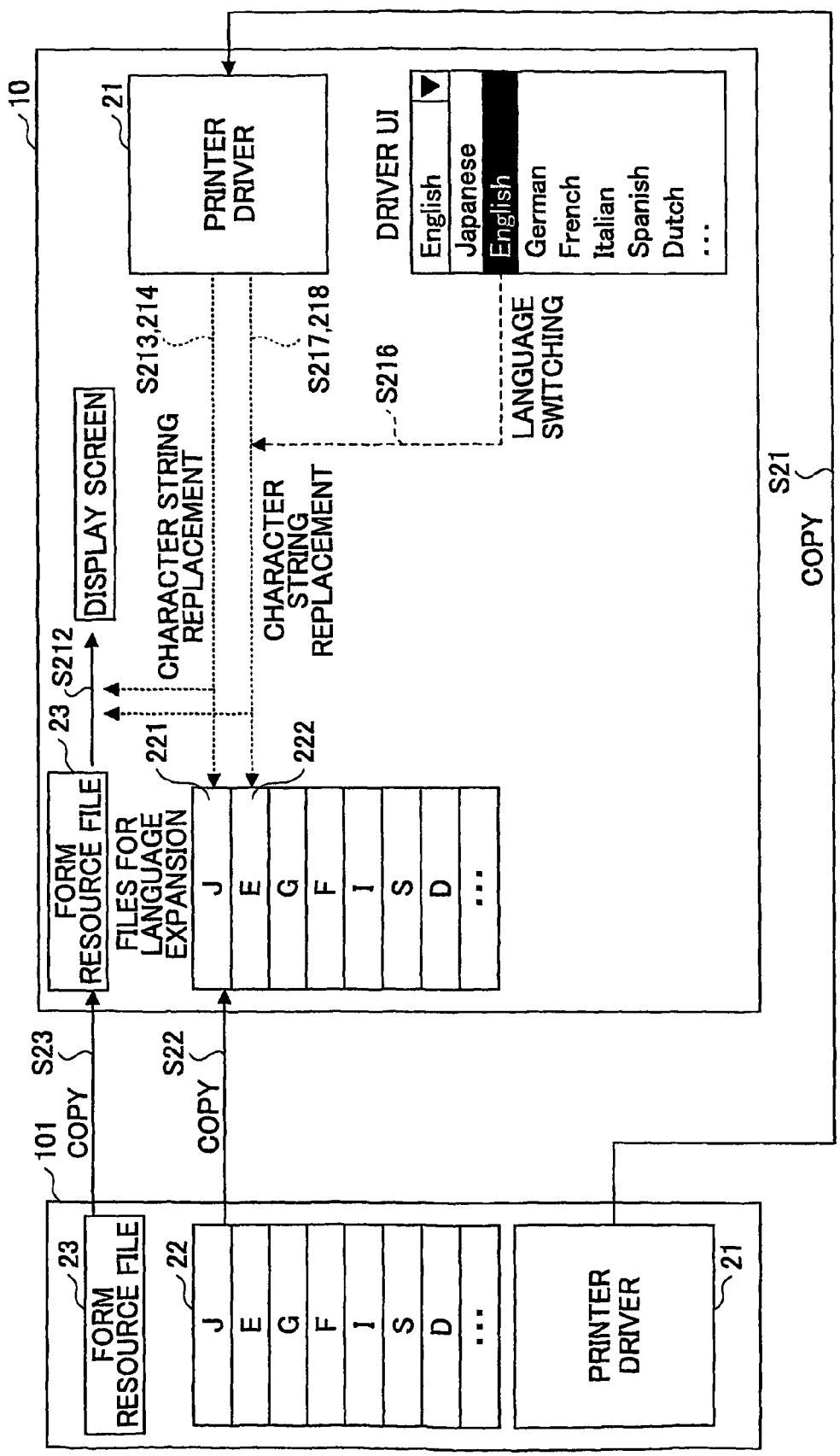

[Japanese]
STR_OK="OK"
STR_CANCEL="キャンセル"
STR_HELP="ヘルプ"
STR0001="環境設定"
STR0002="言語"
STR0003="用紙サイズの初期値"
STR0004="印刷領域の初期値"
STR0005="A4 (210×297mm)"
STR0006="Letter (8 1/2"×11")"
STR0007="日本の印刷領域"
STR0008="日本以外の印刷領域"
STR1001="日本語"
STR1002="英語"
STR1003="ドイツ語"
STR1004="フランス語"
STR1005="イタリア語"
STR1006="スペイン語"
STR1007="オランダ語"

(b)

[English]
STR_OK="OK"
STR_CANCEL="Cancel"
STR_HELP="Help"
STR0001="Environment Settings"
STR0002="Language"
STR0003="Default Paper Size"
STR0004="Default Printable Area"
STR0005="A4 (210×297mm)"
STR0006="Letter (8 1/2"×11")"
STR0007="For Japan"
STR0008="For other countries"
STR1001="Japanese"
STR1002="English"
STR1003="German"
STR1004="French"
STR1005="Italian"
STR1006="Spanish"
STR1007="Dutch"

FIG.8

```xml
<LangList>
  <language name="Japanese">
    <key name="DialogFont"><word>MSPゴシック</word></key>
    <key name="FontSize"><word>9</word></key>
    <key name="STR_OK"><word>OK</word></key>
    <key name="STR_CANCEL"><word>キャンセル</word></key>   ~2201a
    <key name="PPSC_HELP"><word>ヘルプ</word></key>
    <key name="STR0001"><word>環境設定</word></key>
    <key name="STR0002"><word>言語:</word></key>
    <key name="STR0003"><word>用紙サイズの初期値</word></key>
    <key name="STR0004"><word>印刷領域の初期値</word></key>
    <key name="STR0005"><word>A4 ( 210 x 297 mm )</word></key>
    <key name="STR0006"><word>Letter (8 1/2" x 11")</word></key>
    <key name="STR0007"><word>日本の印刷領域</word></key>
    <key name="STR0008"><word>日本以外の印刷領域</word></key>
    <key name="STR1001"><word>日本語</word></key>
    <key name="STR1002"><word>英語</word></key>
    <key name="STR1003"><word>ドイツ語</word></key>
    <key name="STR1004"><word>フランス語</word></key>
    <key name="STR1005"><word>イタリア語</word></key>
    <key name="STR1006"><word>スペイン語</word></key>
    <key name="STR1007"><word>オランダ語</word></key>
  </language>
  <language name="English">
    <key name="DialogFont"><word>MS Sans Serif</word></key>
    <key name="FontSize"><word>8</word></key>
    <key name="STR_OK"><word>OK</word></key>
    <key name="STR_CANCEL"><word>Cancel</word></key>    ~2202a
    <key name="PPSC_HELP"><word>Help</word></key>
    <key name="STR0001"><word>Environment Settings</word></key>
    <key name="STR0002"><word>Language:</word></key>
    <key name="STR0003"><word>Default Paper Size</word></key>
    <key name="STR0004"><word>Default Printable Area</word></key>
    <key name="STR0005"><word>A4 ( 210 x 297 mm )</word></key>
    <key name="STR0006"><word>Letter (8 1/2" x 11")</word></key>
    <key name="STR0007"><word>For Japan</word></key>
    <key name="STR0008"><word>For other countries</word></key>
    <key name="STR1001"><word>Japanese</word></key>
    <key name="STR1002"><word>English</word></key>
    <key name="STR1003"><word>German</word></key>
    <key name="STR1004"><word>French</word></key>
    <key name="STR1005"><word>Italian</word></key>
    <key name="STR1006"><word>Spanish</word></key>
    <key name="STR1007"><word>Dutch</word></key>
  </language>
</LangList>
```

2201 = Japanese block; 2202 = English block; 22a

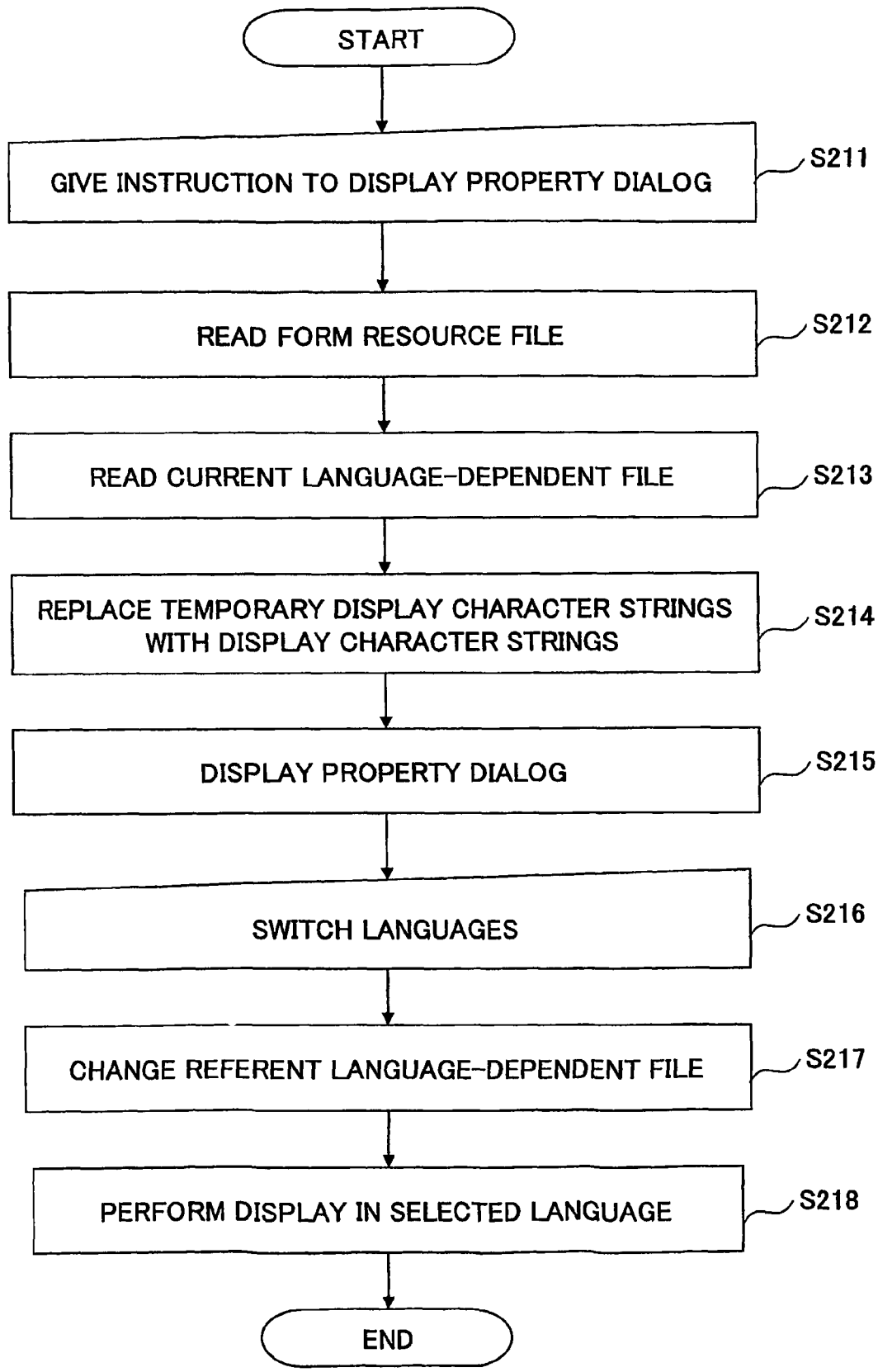

PRINTING CONTROLLER, GUI DISPLAY METHOD, PRINTER DRIVER, AND RECORDING MEDIUM

TECHNICAL FIELD

The present invention relates generally to printing controllers, GUI display methods, printer drivers, and recording media, and more particularly to a printing controller and a GUI display method that support displaying in multiple languages, a printer driver that causes a computer to execute the GUI display method, and a recording medium that contains the printer driver.

BACKGROUND ART

Printer drivers are program modules for controlling a printer. In the case of causing a document to be printed from an application, the printer driver causes its own GUI (Graphical User Interface) to be displayed on a display unit. For example, in a common Windows (registered trademark) application, the application causes a Print dialog to be displayed in response to selection of the Print menu item of a File menu. Pressing a Property button in the Print dialog causes the GUI of a printer driver corresponding to a printer selected as a printing destination, that is, a Printer Property dialog, to be displayed.

It is preferable that a character string on the GUI of a printer driver, such as a Printer Property dialog, be displayed in a language suitable for a user the same as in other common applications. For example, it is convenient for users if displaying is performed in Japanese in an environment where users are Japanese and in English in an environment where users are English-speaking people. Accordingly, so-called "multi-language support" is provided in the conventional printer driver. (See, for example, Japanese Laid-Open Patent Application No. 2000-181650.)

Conventionally, however, common printer drivers are packaged and released on a language basis. Accordingly, if users of such printer drivers wish to use a printer driver in multiple languages, there is a problem in that as many installation operations of printer drivers as the number of languages should be performed. Further, there is also a problem in that printer drivers installed separately for respective languages appear to be printer drivers for different printers to an application although the printer drivers are for the same printer.

A printer driver in support of multiple languages (hereinafter referred to as "multi-language driver") can solve such a problem. In a single installation of the multi-language driver, language-dependent files for multiple languages are installed. When a language to be used is selected after the installation, for example, at the time of printing, the language-dependent files to be used are switched in response to the selection, so that multiple languages can be used. Here, the language-dependent files include a resource file in which a character string displayed on a GUI is stored and a Help file.

In the case of the multi-language driver, however, the language-dependent files of languages that are not usually used are also loaded in their full sizes as they are into a storage medium such as a hard disk in a single installation, thus causing the problem of unnecessarily reducing available resources such as a storage medium.

DISCLOSURE OF THE INVENTION

Embodiments of the present invention may solve or reduce one or more of the above-described problems.

According to one embodiment of the present invention, there are provided a printing controller and a GUI display method in which one or more of the above-described problems may be eliminated, a printer driver that causes a computer to execute the GUI display method, and a recording medium that stores the printer driver.

According to one embodiment of the present invention, there are provided a printing controller and a GUI display method that can perform displaying in multiple languages in a simplified manner while reducing consumption of resources, a printer driver that causes a computer to execute the GUI display method, and a recording medium that contains the printer driver.

According to one embodiment of the present invention, there is provided a printing controller having a printer driver configured to display a GUI using language-dependent files containing display character strings of corresponding languages, the printing controller including a compressed language-dependent file into which the language-dependent files are compressed, a language selection part configured to cause one of the languages which one is used by the printer driver to be selected, and an expansion part configured to expand one of the language-dependent files related to the selected one of the languages from the compressed language-dependent file, wherein the printer driver displays the GUI using the one of the language-dependent files expanded by the expansion part.

According to one embodiment of the present invention, there is provided a printing controller having a printer driver configured to display a GUI based on a resource file containing temporary display character strings directly related to corresponding display components, the printing controller including a language-dependent file configured to contain a display character string for each of a plurality of languages with respect to each of the temporary display character strings contained in the resource file, and a language selection part configured to cause one of the languages which one is used by the printer driver to be selected, wherein the printer driver obtains one or more of the display character strings related to the one of the languages selected by the language selection part based on the temporary display character strings contained in the resource file, and displays the GUI using the obtained one or more of the display character strings.

According to the above-described printing controllers, it is possible to perform displaying in multiple languages in a simplified manner while reducing consumption of resources.

According to one embodiment of the present invention, there is provided a method of displaying a GUI in a printing controller having a printer driver configured to display the GUI using language-dependent files containing display character strings of corresponding languages, the method including the steps of: (a) causing one of the languages which one is used by the printer driver to be selected; (b) expanding one of the language-dependent files related to the selected one of the languages from a compressed language-dependent file into which the language-dependent files are compressed; and (c) displaying the GUI of the printer driver using the one of the language-dependent files expanded in step (b).

According to one embodiment of the present invention, there is provided a method of displaying a GUI in a printing controller having a printer driver configured to display the GUI based on a resource file containing temporary display character strings directly related to corresponding display components, the method including the steps of: (a) causing one of a plurality of languages which one is used by the printer driver to be selected; (b) obtaining, from a language-dependent file configured to contain a display character string for each of the languages with respect to each of the temporary display character strings contained in the resource file, one or more of the display character strings related to the one of the languages selected in step (a) based on the resource file; and (c) displaying the GUI using the obtained one or more of the display character strings in step (b).

According to one embodiment of the present invention, there is provided a printer driver for causing a computer to execute any of the above-described GUI display methods.

According to one embodiment of the present invention, there is provided a computer-readable recording medium on which a printer driver for causing a computer to execute any of the above-described GUI display methods is recorded.

Thus, according to embodiments of the present invention, it is possible to provide a printing controller and a GUI display method that can perform displaying in multiple languages in a simplified manner while reducing consumption of resources, a printer driver for causing a computer to execute the GUI display method, and a recording medium having the printer driver recorded thereon.

BRIEF DESCRIPTION OF THE DRAWINGS

Other objects, features and advantages of the present invention will become more apparent from the following detailed description when read in conjunction with the accompanying drawings, in which:

FIG. 3 is a diagram for giving an overview of processing of the printing controller according to a first embodiment of the present invention;

FIG. 4 is a flowchart for illustrating an operational procedure of a printer driver according to the first embodiment of the present invention;

FIG. 6 is a diagram for giving an overview of processing of the printing controller according to a second embodiment of the present invention;

FIG. 7 is a diagram showing language-dependent file definitions according to the second embodiment of the present invention;

FIG. 8 is a diagram showing a language-dependent file definition according to XML according to the second embodiment of the present invention;

FIG. 9 is a flowchart for illustrating an operational procedure of a printer driver according to the second embodiment of the present invention;

BEST MODE FOR CARRYING OUT THE INVENTION

A description is given, with reference to the accompanying drawings, of embodiments of the present invention.

Figure 1:
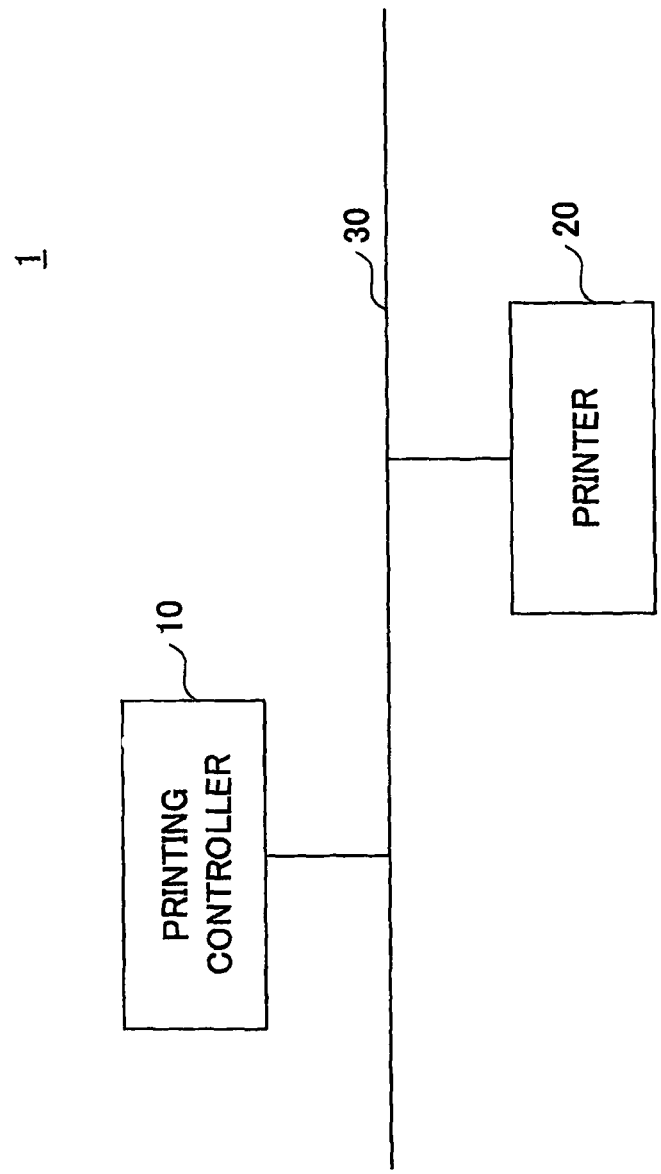
FIG. 1 is a block diagram showing a printing system according to one embodiment of the present invention.

FIG. 1 is a block diagram showing a printing system 1 according to one embodiment of the present invention. Referring to FIG. 1, the printing system 1 includes a printing controller 10 and a printer 20 that are connected through a network 30 (either wire or wireless) such as a LAN (Local Area Network).

The printer controller 10 instructs the printer 20 to print, for example, an electronic document using a printer driver, and is configured of, for example, a general-purpose computer such as a PC (Personal Computer). The printer 20 has a printing function, and may be configured of a common printer or a multi-function copier called "multi-function machine."

The printing system 1 may include multiple printing controllers 10 and printers 20. Further, the printing controller 10 and the printer 20 may be connected with a cable such as a USB cable.

Figure 2:
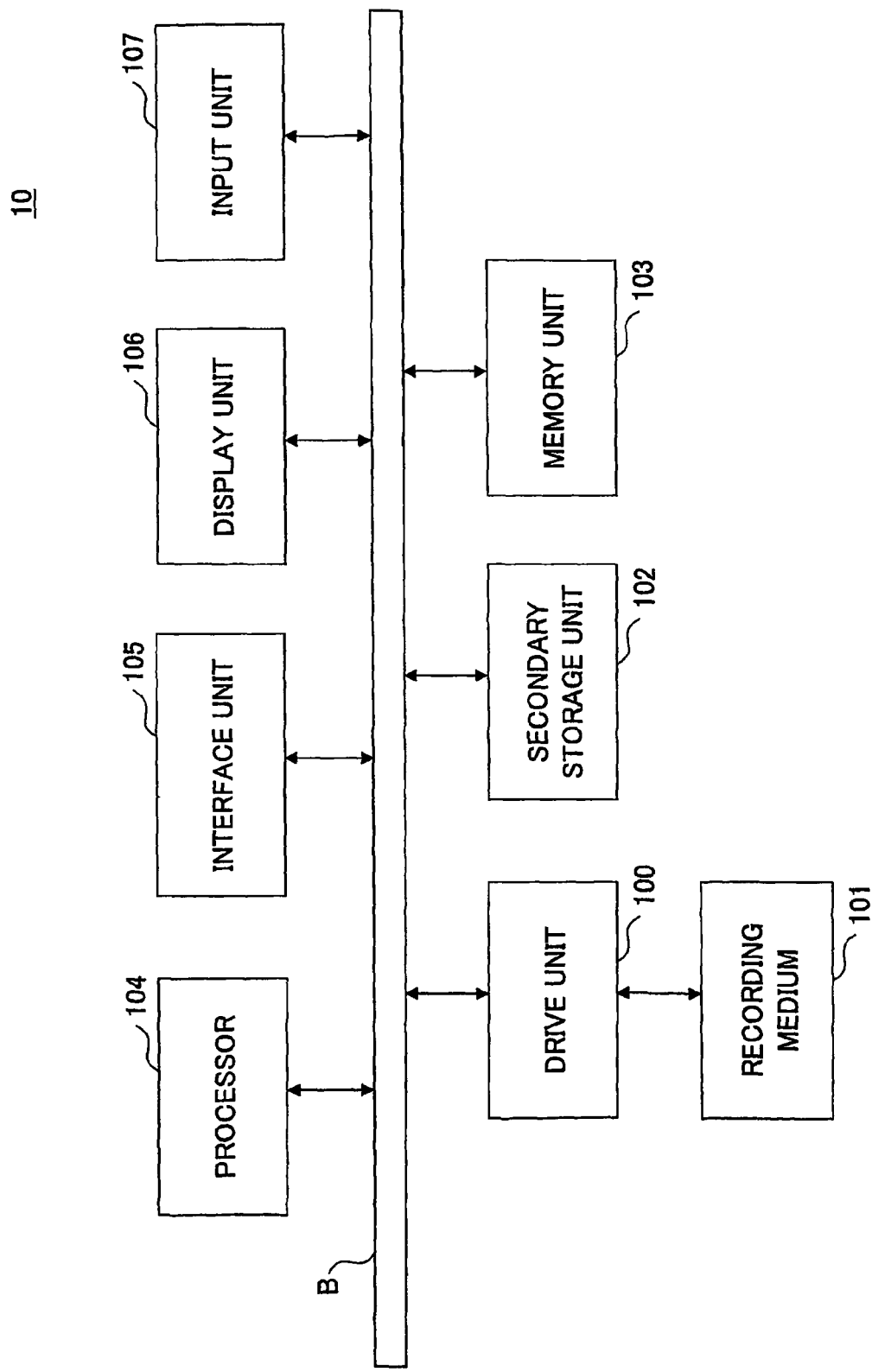
FIG. 2 is a block diagram showing a hardware configuration of a printing controller shown in FIG. 1 according to the present invention.

FIG. 2 is a block diagram showing a hardware configuration of the printing controller 10 according to this embodiment. Referring to FIG. 2, the printing controller 10 includes a drive unit 100, a secondary storage unit 102, a memory unit 103, a processor 104, an interface unit 105, a display unit 106, and an input unit 107, all of which are connected to one another through a bus B.

A program that implements processing in the printing controller 10, such as a printer driver, is provided on a recording medium 101 such as a CD-ROM. When the recording medium 101 on which a program is recorded is loaded into the drive unit 100, the program is installed in the secondary storage unit 102 from the recording medium 101 through the drive unit 100. The secondary storage unit 102 contains the installed program as well as necessary files and data.

The program is read from the secondary storage unit 102 to be stored in the memory unit 103 in response to an instruction to start the program. The processor 104 realizes functions relating to the printing controller 10 in accordance with the program contained in the memory unit 103. The interface unit 105 is used to connect to the network 30 of FIG. 1. The display unit 106 displays a GUI (Graphical User Interface) according to the program. The input unit 107 includes a keyboard and a mouse, and is used to input various operational instructions.

The program does not necessarily have to be installed from the recording medium 101, and may be downloaded from other computers through the network 30.

A description is given of an operational procedure of the printing controller 10. FIG. 3 is a diagram for giving an overview of processing of the printing controller 10 according to a first embodiment of the present invention.

Referring to FIG. 3, the recording medium 101 contains a printer driver 11 and a compressed language-dependent file 12.

The printer driver 11 has logic common to multiple languages. Accordingly, the single printer driver 11 is used in common whichever language is used. The compressed language-dependent file 12 includes compressed language-dependent files of respective languages. Information dependent on a language in the printer driver 11 is contained in a language-dependent file corresponding to the language. Accordingly, each language has its corresponding language-dependent file. The language-dependent information includes a character string displayed on a GUI and Help information. For example, the character string displayed on a GUI is contained in a DLL (Dynamic Link Library) file called "resource file" in the Windows (registered trademark) environment. Accordingly, such a resource file corresponds to the language-dependent file according to this embodiment. In the resource file, (the IDs of) display components on a GUI are directly correlated with their corresponding character strings to be displayed in the display components (display character strings).

Referring to FIG. 3, at the time of installing the printer driver 11, in step S11, the printer driver 11 is copied to the secondary storage unit 102 in the printing controller 10, and in step S12, the compressed language-dependent file 12 is copied to the secondary storage unit 102 in the printing controller 10. Then, in step S13, a language-dependent file 121 of a default language is expanded from the compressed language-dependent file 12. The expanded language-dependent file 121 is determined as the language-dependent file of a language to be displayed (display language). FIG. 3 shows the case where the language-dependent file 121 of the Japanese language is expanded. In FIGS. 3, J, E, G, F, I, S, and D in the compressed language-dependent file 12 stand for the Japanese language, the English language, the German language, the French language, the Italian language, the Spanish language, and the Dutch language, respectively.

A description is given below, using a flowchart, of an operational procedure in the case of the installed printer driver 11 causing a GUI such as a Printer Property dialog to be displayed. The Printer Property dialog, which is one of the GUIs that the printer driver 11 causes to be displayed, is for causing various printing conditions to be determined. For example, common Windows (registered trademark) applications cause a Print dialog to be displayed in response to selection of the Print menu item of a File menu. A printer driver corresponding to a printer selected as a printing destination causes the Printer Property dialog to be displayed in response to the pressing of a Property button in the Print dialog.

FIG. 4 is a flowchart for illustrating an operational procedure of the printer driver 11 according to the first embodiment of the present invention. The step numbers in FIG. 4 correspond to those in FIG. 3; however, FIG. 3 does not show all the steps in FIG. 4.

Referring to FIG. 4, if a user gives an instruction to display a Printer Property dialog by clicking a Property button in a Print dialog displayed by an application in step S111, in step S112, the printer driver 11 reads the language-dependent file of a language currently determined as a language to be displayed. Accordingly, in the case of FIG. 3, the language-dependent file 121 of the Japanese language is read unless switching of languages as described below is performed after installation. Next, in step S113, the printer driver 11 causes the Printer Property dialog to be displayed using the read language-dependent file 121. Accordingly, in the case of FIG. 3, a character string on the Printer Property dialog is displayed in the Japanese language.

Next, it is assumed that the user gives an instruction to switch languages in the Printer Property dialog in step S114. The switching of languages may be performed with a GUI component for causing a language to be selected (such as a combo box) by displaying the GUI component in the Printer Property dialog. Alternatively, the switching of languages may be performed with a GUI component (such as a combo box) on another dialog for switching languages (hereinafter referred to as "language switching dialog") by causing the language switching dialog to be displayed from the Printer Property dialog.

In step S115, the printer driver 11 expands the language-dependent file of a language selected in the language switching instruction from the compressed language-dependent file 12. In the case of FIG. 3, a language-dependent file 122 of the English language is expanded. Next, in step S116, the printer driver 11 deletes the language-dependent file of the language that has been a target of display (the language-dependent file 121 of the Japanese language in the case of FIG. 3). In step S117, the printer driver 11 causes character strings on GUIs such as the Printer Property dialog and the language switching dialog to be displayed using the newly expanded language-dependent file. Accordingly, in FIG. 3, a character string on the GUI is switched to being displayed in the English language.

FIGS. 5A through 5D are diagrams showing how the display language of the language switching dialog switches according to the above-described operation.

Figure 5A:
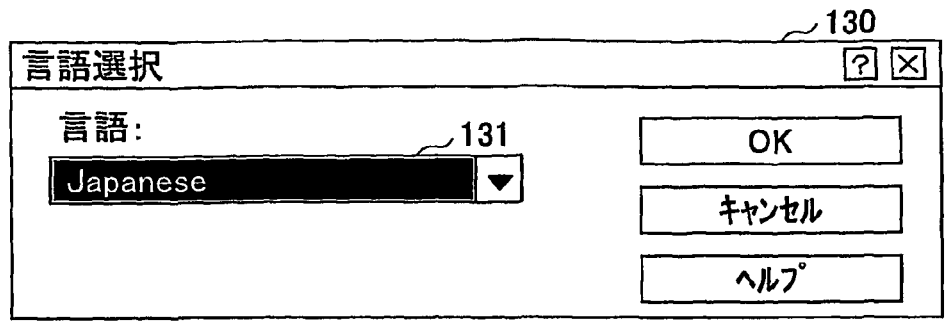
FIGS. 5A through 5D are diagrams showing how the display language of a language switching dialog switches according to the first embodiment of the present invention.

FIG. 5A shows a language switching dialog 130 in which a language-dependent file for the Japanese Language is selected. A combo box 131 is disposed in the language switching dialog 130 as a GUI component for switching languages.

Figure 5B:
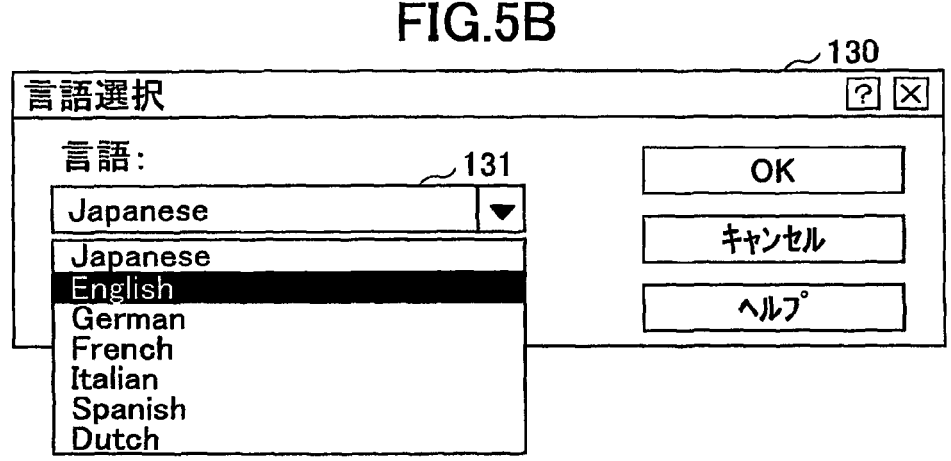
Figure 5C:
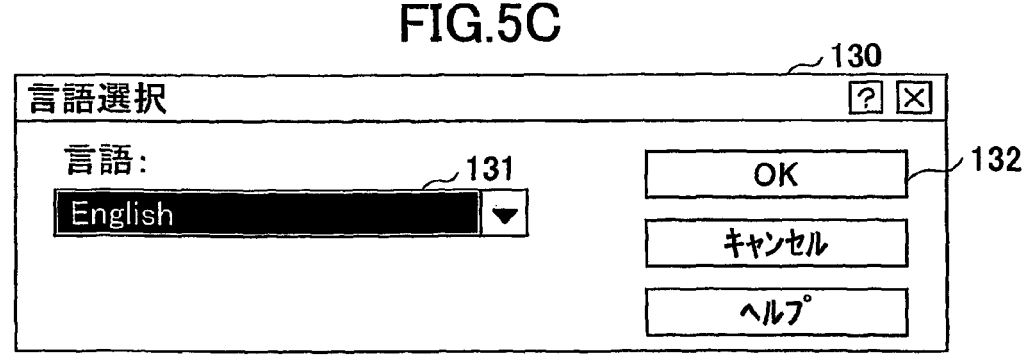
Figure 5D:
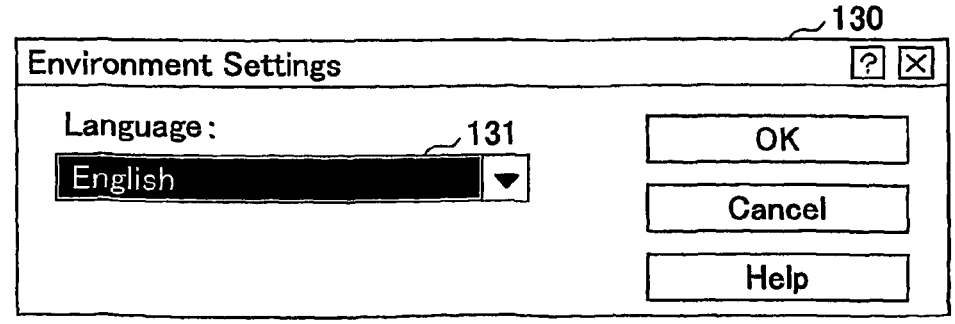

As shown in FIG. 5B, a user can switch display languages using the combo box 131. In FIG. 5B, "English" is selected. Pressing an OK button 132 with "English" being selected in FIG. 5C switches the character strings displayed in the language switching dialog to the English language through the processing of step S115 through S117 of FIG. 4 as shown in FIG. 5D.

As described above, according to the printing controller 10 according to the first embodiment, language-dependent files other than the language-dependent file of a language to be displayed are retained in a compressed state. Accordingly, it is possible to reduce consumption of resources such as the secondary storage unit 102 compared with the case of retaining each language-dependent file in the size of its expanded state.

In the Windows (registered trademark) environment, a resource file, which corresponds to a language-dependent file, is implemented as a DLL. However, since the DLL requires operations such as compiling and linking for its generation, there may be some inconvenience in handling the DLL. Therefore, a description is given of a second embodiment where handling a language-dependent file is facilitated.

FIG. 6 is a diagram for giving an overview of processing of the printing controller 10 according to the second embodiment. Referring to FIG. 6, the recording medium 101 contains a printer driver 21, a language-dependent file 22, and a form resource file 23.

The printer driver 21 has logic common to multiple languages. Accordingly, the single printer driver 21 is used in common whichever language is used. In the form resource file 23, (the IDs of) display components on a GUI (Graphical User Interface) are directly correlated with their corresponding character strings to be displayed in the display components (display character strings). For example, the form resource file 23 is implemented as a DLL resource file in the Windows (registered trademark) environment. In the form resource file 23 according to this embodiment, however, not a character string to be actually displayed but a character string in the form of an ID (hereinafter referred to as "temporary display character string") is correlated with its corresponding display component.

In the language-dependent file 22, display character strings to be actually displayed are contained in text format for each language. The language-dependent file 22 may be separately provided for each language or be a single file divided on a language-basis. In this embodiment, it is assumed that the language-dependent file 22 is separately provided for each language. The language-dependent file 22 defines the correspondence between the temporary display character strings in the form resource file 23 and the display character strings.

FIG. 7 is a diagram showing language-dependent file definitions according to the second embodiment. In FIG. 7, (a) indicates the contents of a definition of the language-dependent file 22 for the Japanese language, and (b) indicates the contents of a definition of the language-dependent file 22 for the English language. In each case, the display character strings for their corresponding display components are defined in text format in the form of <temporary display character string>=<display character string>. That is, for example, "STR_OK" and "STR_CANCEL" represent temporary display character strings. In the form resource file 23, these temporary display character strings in the form of IDs are correlated with their corresponding display components. In the language-dependent files 22 of FIG. 7, a Japanese display character string corresponding to "STR_CANCEL" is defined as "キャンセル", and its English counterpart is defined as "Cancel."

The language-dependent file 22 may also be defined in XML (eXtensible Markup Language) format. FIG. 8 is a diagram showing a language-dependent file definition according to XML according to the second embodiment. FIG. 8 shows the case of a single language-dependent file divided on a language basis.

In a language-dependent file 22*a* of FIG. 8, for each language, a language element is defined as the child element of a <LangList> element enclosed by <LangList> tags. A language to which each language element corresponds is identified by the name attribute of the language element. In FIG. 8, a language element 2201 corresponds to the Japanese language, and a language element 2202 corresponds to the English language.

In each language element, key elements are defined as child elements. In one key element, the correspondence between a temporary display character string and a display character string is defined. The value of the name attribute of the key element indicates a temporary display character string. The value of a word element, which is the child element of the key element, indicates a display character string. Accordingly, for example, in a key element 2201*a*, which is a child element of the language element 2201 corresponding to the Japanese language, "キャンセル" is defined as the display character string corresponding to "STR_CANCEL." Further, in a key element 2202*a*, which is a child element of the language element 2202 corresponding to the English language, "Cancel" is defined as the display character string corresponding to "STR_CANCEL."

Referring back to FIG. 6, at the time of installing the printer driver 21, the printer driver 21 is copied in step S21, the language-dependent files 22 are copied in step S22, and the form resource file 23 is copied in step S23, to the secondary storage unit 102 in the printing controller 10. At this point, a language to be displayed is determined automatically by an installer, or by a user's selection.

A description is given below, using a flowchart, of an operational procedure at the time of the installed printer driver 21 causing a GUI such as a Printer Property dialog to be displayed.

FIG. 9 is a flowchart for illustrating an operational procedure of the printer driver 21 according to the second embodiment. The step numbers in FIG. 9 correspond to those in FIG. 6; however, FIG. 6 does not show all the steps in FIG. 9.

Referring to FIG. 9, if a user gives an instruction to display a Printer Property dialog in step S211, in step S212, the printer driver 21 reads the form resource file 23. Here, if the form resource file 23 is treated the same as a regular resource file, the printer driver 21 displays a GUI as shown in FIG. 10.

Figure 10:
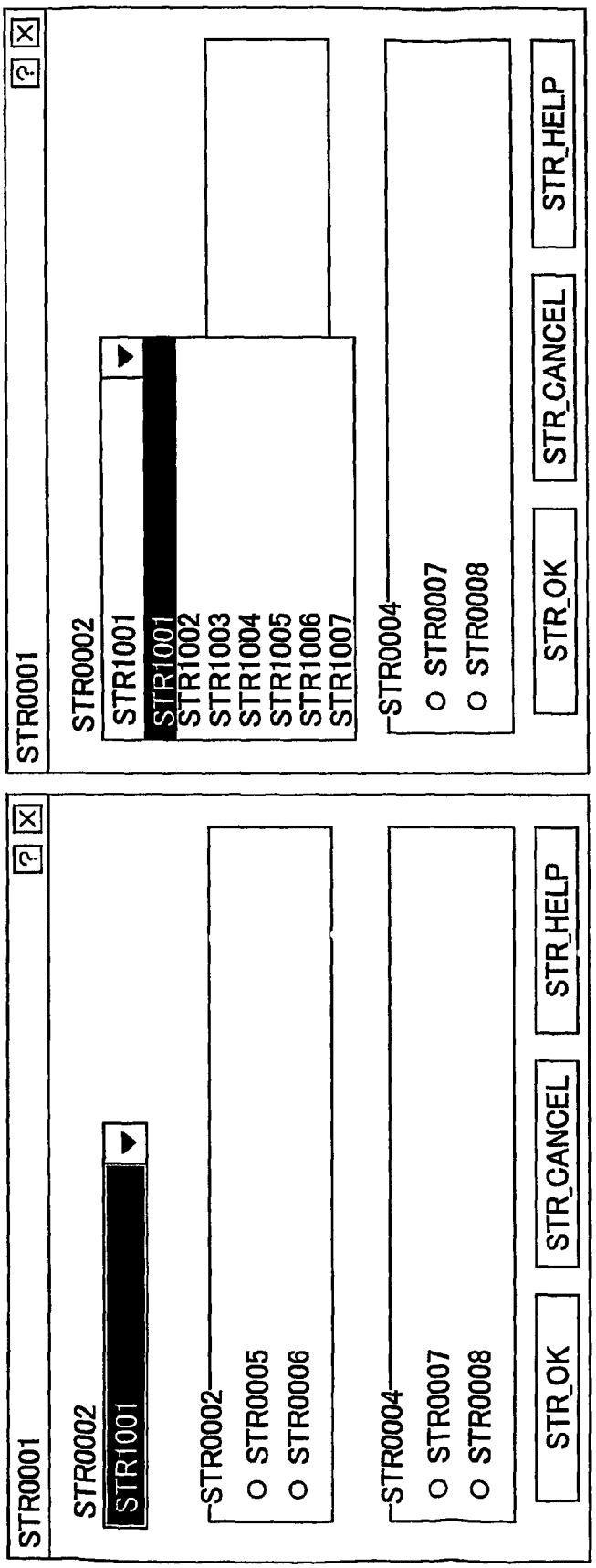
FIG. 10 is a diagram showing a GUI of the printer driver displayed based on a form resource file according to the second embodiment of the present invention.

FIG. 10 is a diagram showing a GUI of the printer driver 21 displayed based on the form resource file 23. As shown in FIG. 10, a temporary display character string such as "STRXXXX" is directly displayed as a display character string in each display component on the dialog. This does not make any sense to the user as a user interface. Accordingly, the following operation is performed.

After step S212, in step S213, the printer driver 21 reads the language-dependent file 22 of a language currently determined as a target of display, and in step S214, the printer driver 21 replaces the temporary display character strings in the form resource file 23 with corresponding display character strings in the read language-dependent file 22 based on their correspondence in the language-dependent file 22. FIG. 6 shows the case where a language-dependent file 221 of the Japanese language is read.

Next, in step S215, the printer driver 21 causes the Printer Property dialog to be displayed using the replacing display character strings. Accordingly, in the case of FIG. 6, the character strings on the Printer Property dialog are displayed in the Japanese language.

Figure 11:
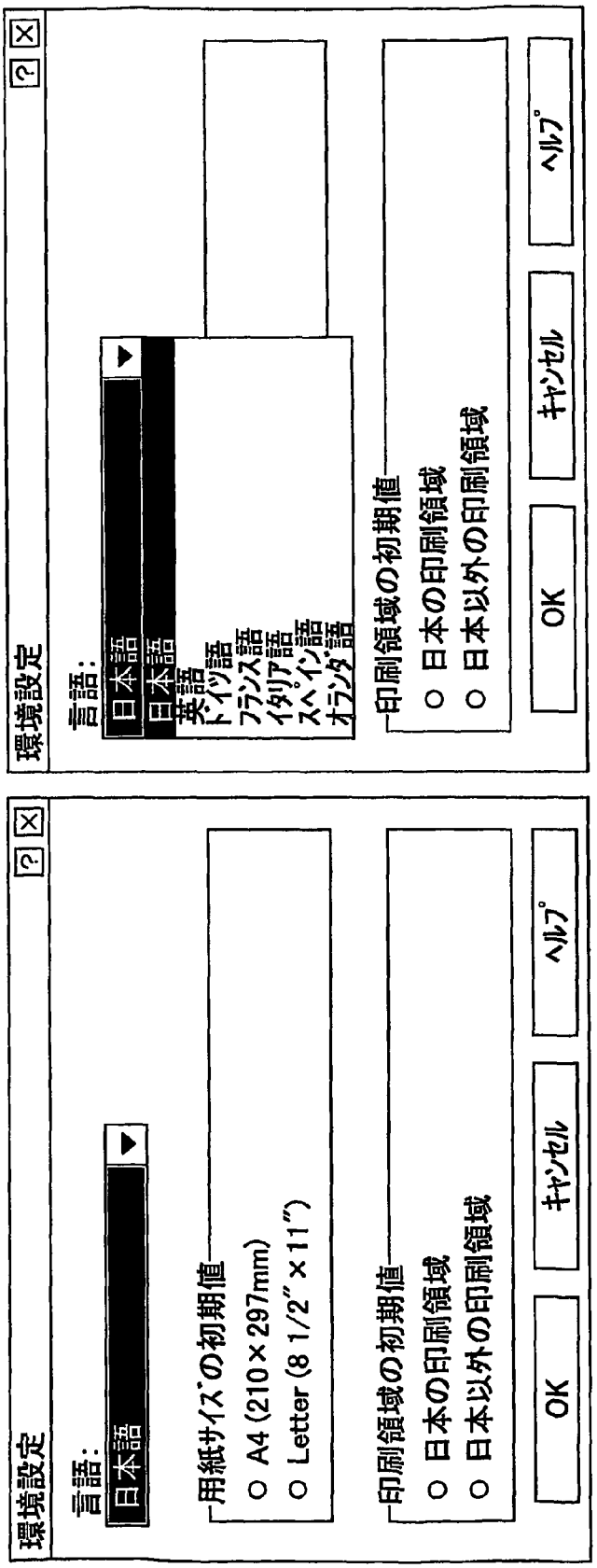
FIG. 11 is a diagram showing the case where the GUI of the printer driver is displayed in the Japanese language according to the second embodiment of the present invention.

FIG. 11 is a diagram showing the case where the GUI of the printer driver 21 is displayed in the Japanese language according to the second embodiment. Unlike in FIG. 10, the display character string of each display component of the dialog in FIG. 11 is displayed in the Japanese language. This is because the temporary display character strings that are directly displayed in FIG. 10 are replaced with display character strings in the Japanese language.

Next, it is assumed that the user gives an instruction to switch languages in the Printer Property dialog in step S216. The switching of languages may be performed in the same manner as in the first embodiment.

In step S217, the printer driver 21 determines as a target of display and newly reads the language-dependent file 22 of the selected language. Next, in step S218, the printer driver 21 replaces the temporary display character strings with corresponding display character strings in the newly read language-dependent file 22, and causes the Printer Property dialog to be displayed using the replacing display character strings.

FIG. 6 shows the case where the language-dependent file 221 of the Japanese language is switched to a language-dependent file 222 of the English language. Accordingly, in this case, the character strings on the Printer Property dialog are displayed in the English language.

Figure 12:
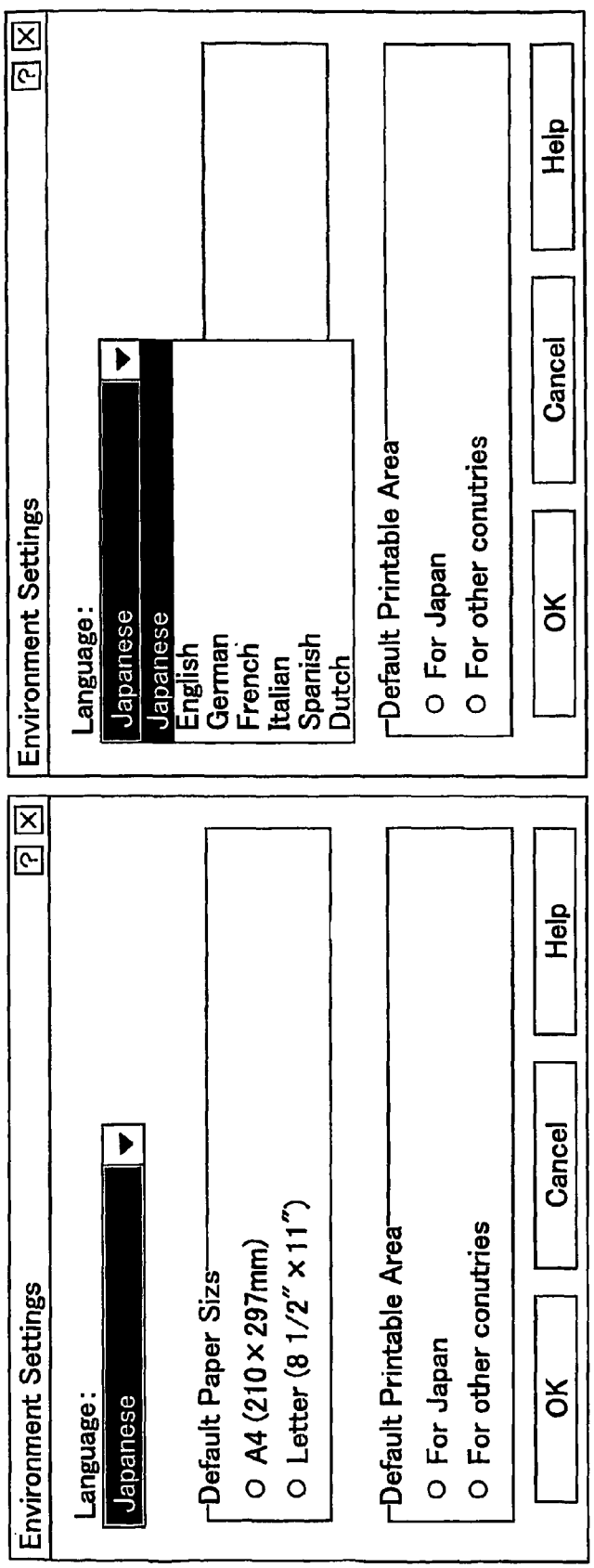
FIG. 12 is a diagram showing the case where the GUI of the printer driver is displayed in the English language according to the second embodiment of the present invention.

FIG. 12 is a diagram showing the case where the GUI of the printer driver 21 is displayed in the English language according to the second embodiment. Unlike in FIG. 10, the display character string of each display component of the dialog is displayed in the English language in FIG. 12. This is because the temporary display character strings that are directly displayed in FIG. 10 are replaced with display character strings in the English language.

As described above, according to the printing controller 10 according to the second embodiment, the language-dependent file 22 can be implemented with a file in text format. Accordingly, handling a language-dependent file is facilitated, for example, it is possible to check displaying of a GUI without performing compiling and linking after editing the language-dependent file 22. Further, since the language-dependent file 22 according to the second embodiment is in text format, it is possible to reduce consumption of resources such as the secondary storage unit 102 without compressing the language-dependent file 22. However, the language-dependent files 22 other than that determined as a display target may be compressed the same as in the first embodiment. The operational procedure in this case is obvious from the first embodiment and the second embodiment, and a description thereof is omitted.

According to one embodiment of the present invention, there is provided a printing controller having a printer driver configured to display a GUI using language-dependent files containing the display character strings of corresponding languages, the printing controller including a compressed language-dependent file into which the language-dependent files are compressed, a language selection part configured to cause one of the languages which one is used by the printer driver to be selected, and an expansion part configured to expand one of the language-dependent files related to the selected one of the languages from the compressed language-dependent file, wherein the printer driver displays the GUI using the one of the language-dependent files expanded by the expansion part.

According to one embodiment of the present invention, there is provided a printing controller having a printer driver configured to display a GUI based on a resource file containing temporary display character strings directly related to corresponding display components, the printing controller including a language-dependent file configured to contain a display character string for each of multiple languages with respect to each of the temporary display character strings contained in the resource file, and a language selection part configured to cause one of the languages which one is used by the printer driver to be selected, wherein the printer driver obtains one or more of the display character strings related to the one of the languages selected by the language selection part based on the temporary display character strings contained in the resource file, and displays the GUI using the obtained one or more of the display character strings.

According to the above-described printing controllers, it is possible to perform displaying in multiple languages in a simplified manner while reducing consumption of resources.

According to one embodiment of the present invention, there is provided a method of displaying a GUI in a printing controller having a printer driver configured to display the GUI using language-dependent files containing the display character strings of corresponding languages, the method including the steps of: (a) causing one of the languages which one is used by the printer driver to be selected; (b) expanding one of the language-dependent files related to the selected one of the languages from a compressed language-dependent file into which the language-dependent files are compressed; and (c) displaying the GUI of the printer driver using the one of the language-dependent files expanded in step (b).

According to one embodiment of the present invention, there is provided a method of displaying a GUI in a printing controller having a printer driver configured to display the GUI based on a resource file containing temporary display character strings directly related to corresponding display components, the method including the steps of: (a) causing one of multiple languages which one is used by the printer driver to be selected; (b) obtaining, from a language-dependent file configured to contain a display character string for each of the languages with respect to each of the temporary display character strings contained in the resource file, one or more of the display character strings related to the one of the languages selected in step (a) based on the resource file; and (c) displaying the GUI using the obtained one or more of the display character strings in step (b).

According to one embodiment of the present invention, there is provided a printer driver for causing a computer to execute any of the above-described GUI display methods.

According to one embodiment of the present invention, there is provided a computer-readable recording medium on which a printer driver for causing a computer to execute any of the above-described GUI display methods is recorded.

Thus, according to embodiments of the present invention, it is possible to provide a printing controller and a GUI display method that can perform displaying in multiple languages in a simplified manner while reducing consumption of resources, a printer driver for causing a computer to execute the GUI display method, and a recording medium having the printer driver recorded thereon.

The present invention is not limited to the specifically disclosed embodiments, and variations and modifications may be made without departing from the scope of the present invention.

The present application is based on Japanese Priority Patent Applications No. 2006-066269, filed on Mar. 10, 2006, and No. 2007-014071, filed on Jan. 24, 2007, the entire contents of which are hereby incorporated by reference.

The invention claimed is:

1. A method of operating a printer driver, comprising the steps of:
   displaying a GUI of the printer driver using the default language-dependent file which has been expanded;
   displaying a printer dialog box, the printer dialog box being displayed each time a user selects a print menu item and displaying information which allows a user to select an alternative language;
   selecting, by the user using the printer dialog box, the alternative language used with the GUI of the printer driver, the alternative language used for displaying information using the GUI regarding the printer which outputs characters or images on media;
   expanding an alternative language-dependent file which corresponds to the alternative language which has been selected; and
   displaying the GUI of the printer driver using the alternative language-dependent file has been expanded and which corresponds to the alternative language file which has been selected.

2. The method according to claim 1, wherein the GUI of the printer driver includes the printer dialog box.

3. The method according to claim 1, further comprising:
   deleting the default language-dependent file which has been expanded, after the selecting of the alternative language used with the GUI of the printer driver.

4. The method according to claim 1, wherein
   the displaying of the printer dialog box is performed each time the user selects the print menu item which is of a file menu.

5. A system, comprising:
   an expanding part for expanding a default language-dependent file;
   a display to display a GUI of the printer driver using default language-dependent file which has been expanded;
   a display for displaying a printer dialog box, the printer dialog box being displayed each time a user selects a print menu item and displaying information which allows a user to select an alternative language;
   a selecting part for selecting, by the user using the printer dialog box, the alternative language used with the GUI of the printer driver, the alternative language used for displaying information using the GUI regarding the printer which outputs characters or images on media;
   an expanding part for expanding an alternative language-dependent file which corresponds to the alternative language which has been selected; and a display for displaying the GUI of the printer driver using the alternative language-dependent file has been expanded and which corresponds to the alternative language file which has been selected.

6. The system according to claim 5, wherein the GUI of the printer driver includes the printer dialog box.

7. The system according to claim 5, further comprising:
a deleting part which deletes the default language-dependent file which has been expanded, after the selecting of the alternative language used with the GUI of the printer driver.

8. The system according to claim 6, wherein
the displaying of the printer dialog box is performed each time the user selects the print menu item which is of a file menu.

9. A non-transitory computer-readable recording medium on which a printer driver for causing a computer to execute the method of claim 1 is recorded.

* * * * *